Sept. 16, 1947.  J. F. SEBALD  2,427,422
WATER PURIFYING APPARATUS HAVING INLET WATER SPRAY NOZZLES
AND MEANS TO DIRECT STEAM INTO THE PATHS OF THE WATER
Filed Feb. 23, 1945  2 Sheets-Sheet 1

Joseph F. Sebald
INVENTOR

BY
ATTORNEY

Sept. 16, 1947. J. F. SEBALD 2,427,422
WATER PURIFYING APPARATUS HAVING INLET WATER SPRAY NOZZLES
AND MEANS TO DIRECT STEAM INTO THE PATHS OF THE WATER
Filed Feb. 23, 1945 2 Sheets-Sheet 2

Joseph F. Sebald
INVENTOR

BY
ATTORNEY

Patented Sept. 16, 1947

2,427,422

UNITED STATES PATENT OFFICE 2,427,422

WATER PURIFYING APPARATUS HAVING INLET WATER SPRAY NOZZLES AND MEANS TO DIRECT STEAM INTO THE PATHS OF THE WATER

Joseph F. Sebald, Bloomfield, N. J., assignor to Worthington Pump and Machinery Corporation, Harrison, N. J., a corporation of Delaware Application February 23, 1945, Serial No. 579,336

6 Claims. (Cl. 210—14)

This invention relates to water treating apparatus, and more particularly to an improved hot process water softener for purification of boiler feedwater, or water for other uses wherein heated deaerated or degasified water is required. The primary object of the present invention is to provide improved means for heating, purifying, and for deaerating or degasifying water for boiler feed or analogous purposes, which means is constructed and arranged to provide maximum heat transfer between heating steam and the water, utilizing the steam first to heat the water which has been treated and purified. The heated purified water is degasified by its passage into an area of low pressure, while the steam which is not condensed by the heating of the treated water passes on in the apparatus to contact the incoming raw water to provide heating thereof prior to its treatment by chemicals for purification.

Among the objects of the present invention is the provision of means to impart a whirling action to the steam as it enters the part of the apparatus where it is brought into heat transfer contact with the incoming raw or untreated water so as to provide agitation of the water, preferably in a horizontal whirling manner to insure effective mixing of the water and the incoming reagent for treating chemicals as well as increasing the heat transfer relation of the steam and water.

The present invention relates to my companion application, Serial Number 450,265 filed July 9, 1942.

With these and other objects in view, as may appear from the accompanying specification, the invention consists of various features of construction and combination of parts, which will be first described in connection with the accompanying drawings, showing a water purifying and degasifying apparatus of a preferred form embodying the invention, and the features forming the invention will be specifically pointed out in the claims.

In the drawings:

Figure 3 is a cross section on the line 3—3 of Figure 1.

Figure 5 is a detail horizontal section on the line 5—5 of Figure 1.

Figure 6 is a detail section illustrating the specific arrangement of the nozzles which project the raw water into the water purifying and degasifying apparatus.

Figure 1:
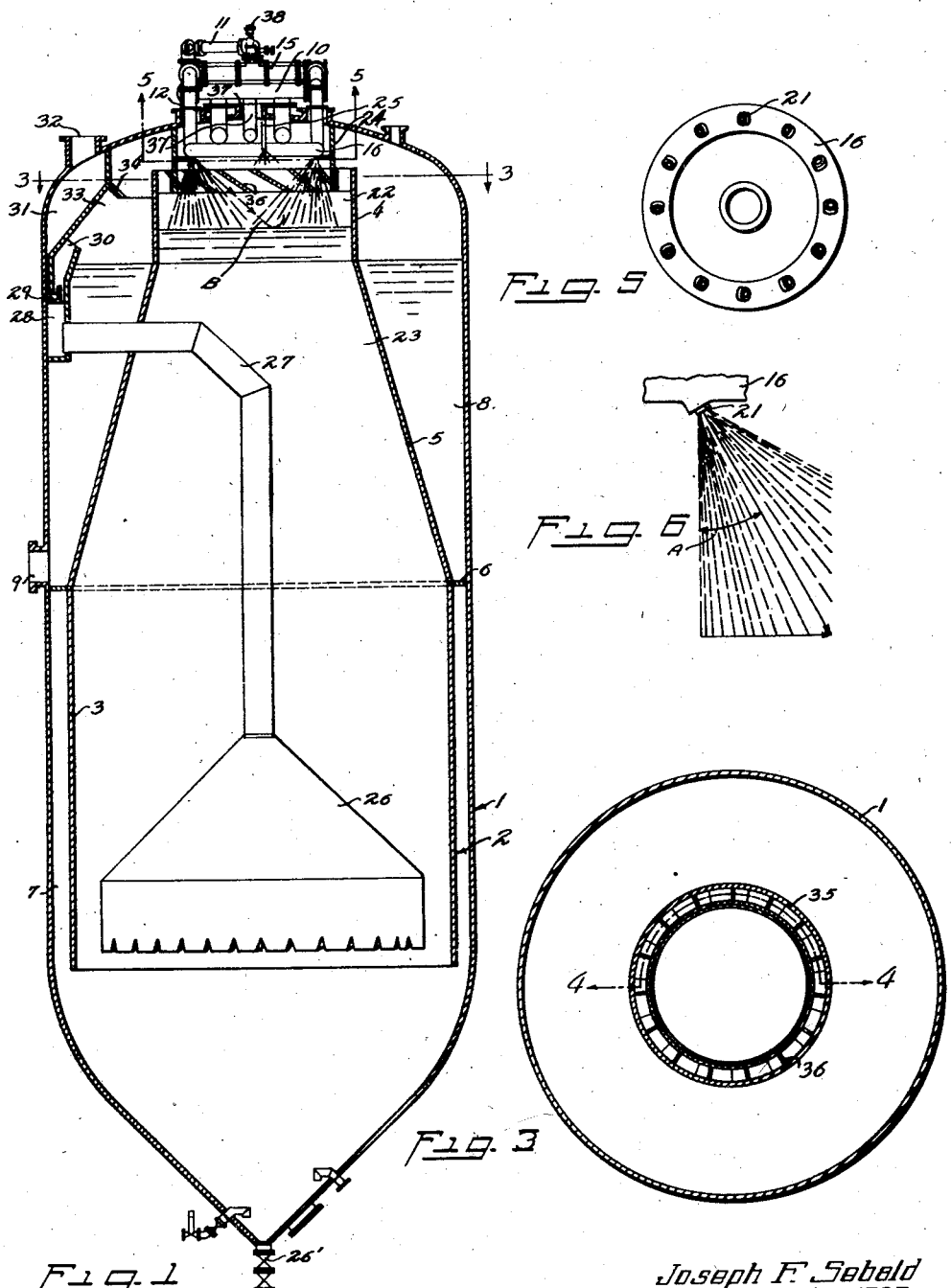
Figure 1 is a longitudinal section through the improved water purifying and degasifying apparatus.
Figure 2:
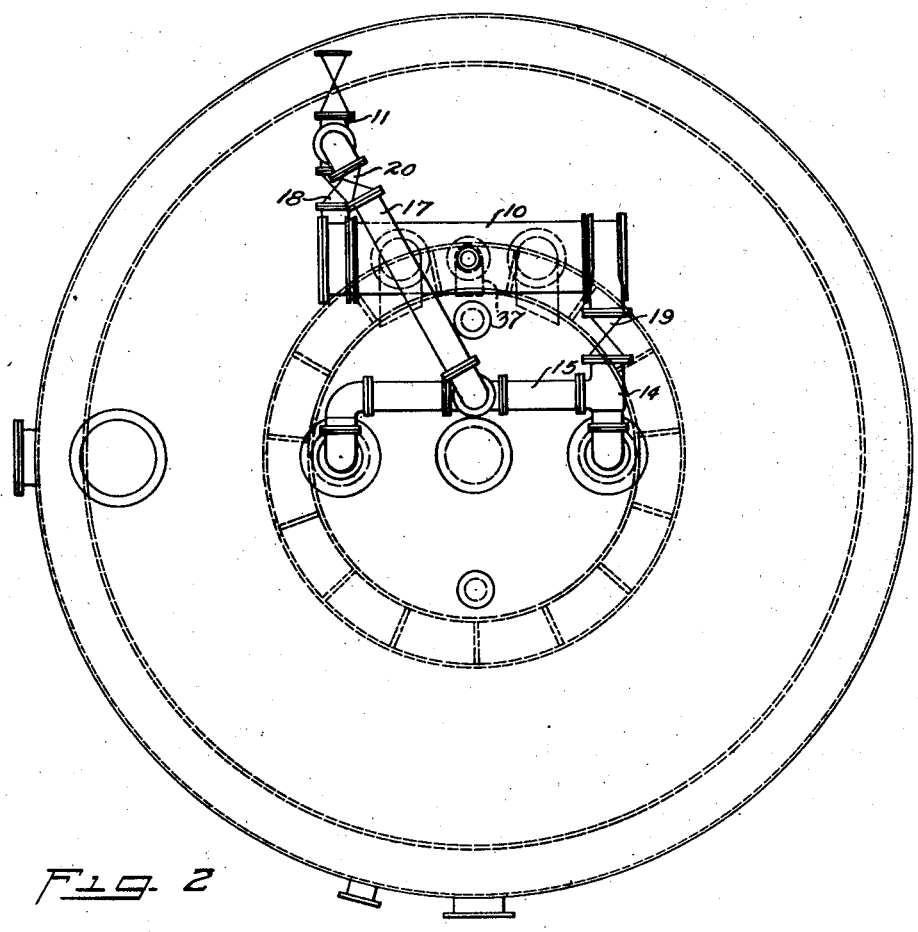
Figure 2 is a top plan of the apparatus.
Figure 4:
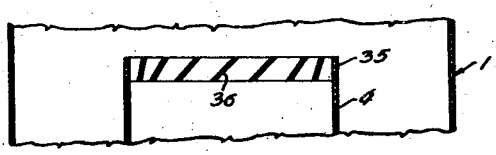
Figure 4 is a detail section taken on the line 4—4 of Figure 3.

Referring more particularly to the drawings, the water purifying and degasifying apparatus comprises a tank or receptacle 1 in which is an annular partition 2, the lower part 3 and the uppermost part 4 are substantially cylindrical in shape, while the intermediate part 5 tapers inwardly toward its axis as it extends upwardly to the junction with the cylindrical part 4. A horizontal partition 6 extends across the space between the annular partition 2 and the inner surface of the tank or receptacle 1 to provide a lower wash water compartment 7 and an upper treated water retaining chamber 8 from which the treated water is drawn off as needed through an outlet 9.

The raw water to be treated is delivered to a vent condenser 10 through a suitable supply pipe 11 wherein the water serves to condense any condensible vapors which pass out of the top of the receptacle 1 into the vent condenser through the vapor and gas outlets 12. From the vent condenser 10 the water passes through a valve pipe connection 14 into the distributor pipe 15 which in turn delivers the water to the spray ring 16. A branch pipe 17 is connected to the raw water supply pipe 11 and directly to the distributor pipe 15 so that if it is desired, the valve 18 which controls the flow of raw water into the vent condenser 10 may be closed, and the valve 19 in the outlet pipe 14 also closed, while the valve 20 in the branch pipe 17 is open thus permitting raw water to flow directly to the distributor pipe 15 without passing through the vent condenser 10.

The spray ring 16 has a plurality of spray nozzles 21 carried thereby at circumferentially spaced points. The spray ring 16 is concentric to the axis of the tank or receptacle 1 and is located near the top thereof. The raw water enters the spray ring 16 under pressure and is sprayed from the ring through the spray nozzles 21 into the initial heating portion or mixing space 22. The spray nozzles 21 are arranged in space relation about the bottom of the spray ring 16 and they are inclined to the vertical, as clearly shown in Figure 6 of the drawings, so that the water sprayed therefrom will pass through the initial heating and mixing space 22 in an angular path, the component of angularity being shown in Figure 6 of the drawings and indicated by the arrow A. The angularity of the flow of the water from the spray nozzles 21 is such that the water assumes a circular path during its passage through the initial heating and mixing space 22 and as it enters the reaction settling chamber 23 formed within the annular partition 2, causing vigorous rotation of the water in the reaction settling chamber 23. An annular skirt 24 is carried by the top of the receptacle 1 and projects downwardly about the spray ring 16 for a suitable distance to confine the multiple fine sprays of water projected between spray nozzles within a predetermined area.

A suitable reagent or treating chemical is sprayed into the intial heating and mixing space 22 by a suitable spray pipe 25.

The incoming raw water mixed with the reagent or treating chemical passes downwardly through the reaction chamber 23, during which time the impurities or foreign matter in the water separates out from the water and falls into the bottom of the receptacle 1 in the form of sludge, being drawn off therefrom through a suitable outlet 26', as and when necessary. The treated water passes into the conduction cone 26 and passing upwardly therefrom through a suitable conduit 27 is delivered to the chamber 28 formed in the receptacle 1 near the top thereof. From the chamber 28 the water is educted through a relatively small passage 29 into and through the mixing passage 30 by the incoming steam which enters the steam inlet chamber 31 through a suitable inlet 32. The steam passes downwardly through the steam inlet chamber 31 and upwardly into the mixing passage 30 where it mixes with the purified water being drawn from the chamber 28 by the eduction action of the flowing steam. The steam and water become thoroughly mixed in the mixing passage 30 and they are discharged therefrom into the space 33 above the surface of the water in the treated water chamber 8. This space 33 is under a lower pressure than the chamber 31 and the mixing passage 30 so that as the mixed steam and water enter this low pressure space there is a separation of the non-condensible gases and the non-condensed or residual steam from the water. The water falls into the treated water chamber 8, being directed thereto by an annular downwardly inclined baffle 34, while the steam and the non-condensible gases pass upwardly about the edge of the baffle 34 into the space surrounding the skirt 24 and above the entrance to the initial heating and mixing space 22.

A double ring 35 is carried by the top of the circular portion 4 of the annular partition 2, and this ring has a plurality of circumferentially spaced annularly disposed inclined baffles 36 carried thereby which direct the steam downwardly and obliquely into the initial heating and mixing space 22 in an angular whirling direction, the degree of angularity of the path of the incoming steam with respect to the vertical centerline of the tank is greater than the degree of angularity of the incoming streams of water sprayed by the spray nozzles 21, so that the incoming steam flows partly across the paths of the incoming fine streams of water but in the same general angular direction so as to set up an increased degree of turbulence in the space 22, for both increasing the heat transfer relation between the streams of water and the streams of incoming steam, and to increase the mixing action of the steam, water, and chemicals in the space 22, as well as to increase the force which creates the substantially horizontal rotational path of the water in the reaction chamber 23.

The steam which is not condensed in the chamber or space 22 together with any non-condensible gases carried into the chamber with the steam turn upwardly, as indicated by the dotted line B in Figure 1 of the drawings, when it strikes the surface of the water in the reaction chamber. Such non-condensed steam and non-condensible gases find their way to the outlet pipes 12 from which they pass into the vent condenser 10. In the vent condenser 10, the steam vapors are condensed, returning in the form of condensate to the space 22 through the condensate return pipe 37, while the non-condensible gases are delivered to atmosphere or any other suitable point through the gas outlet 38.

What is claimed is:

1. In a hot process water treating apparatus, a treating receptacle having a reaction chamber and an outlet for treated water therein, means for delivering a chemical reagent into said reaction chamber a plurality of spray nozzles for spraying water to be treated into said reaction chamber, said spray nozzles being arranged at acute angles to the axis of said reaction chamber to direct incoming sprayed water in such manner as to cause rotation of the water in the reaction chamber in substantially horizontal paths, an inlet for steam to said reaction chamber, and means independently of said spray nozzle for directing the entering steam in whirling paths of greater angularity than the angles of projection of said water into the reaction chamber prior to mixing contact of the steam and water and to set up turbulence of the water and steam in the reaction chamber.

2. In a hot process water treating apparatus, a receptacle, an annular partition within said receptacle forming a reaction chamber, a horizontal partition in said receptacle forming a treated water compartment in the receptacle about said annular partition, means opening into the bottom of the reaction chamber and forming a communicating space through which water passes from said reaction chamber to said treated water compartment, means forming a steam inlet space in said receptacle having a discharge opening into said communicating space, means forming a restricted passage in the receptacle having inlet communication with said communicating space and steam inlet space and outlet communication with the treated water compartment whereby steam and water will flow in the same direction through said restricted passage to thoroughly mix the steam and water, said receptacle having a mixing space therein above said reaction chamber, said mixing space having communication with said restricted passage for receiving residual steam from the restricted passage, means for spraying water to be treated through said mixing space into said reaction chamber, means for spraying chemical reagents in finely divided streams through said steam space into said reaction chamber, means independently of the means for spraying the water through said mixing space for directing the steam entering said mixing space in whirling paths at acute angles to and across the paths of the water sprayed through the mixing space to provide intimate contact of the steam and water and to set up turbulence of the water and steam in the mixing space, and an outlet means for treated water communicating with said treated water chamber.

3. In a hot process water treating apparatus, a receptacle, an annular partition within said receptacle forming a reaction chamber, a horizontal partition in said receptacle forming a treated water compartment in the receptacle about said annular partition, means opening into the bottom of the reaction chamber and forming a communicating space through which water passes from said reaction chamber to said treated water compartment, means forming a steam inlet space in said receptacle having a discharge opening into said communicating space, means forming a restricted passage in the receptacle having inlet communication with said communicating space and steam inlet space and outlet communication with the treated water compartment whereby steam and water will flow in the same direction through said restricted passage to thoroughly mix the steam and water, said receptacle having a mixing space therein above said reaction chamber, means for delivering a chemical reagent into said mixing space said mixing space having communication with said restricted passage for receiving residual steam from the restricted passage, means for spraying water to be treated through said mixing space into said reaction chamber, means for spraying chemical reagents in finely divided streams through said steam space into said reaction chamber, and a plurality of circumferentially spaced annularly disposed inclined baffles in the path of the residual steam entering the mixing space to direct the entering steam in paths at acute angles to the paths of the entering water to cause intimate contact of the steam and water and to set up turbulence of the water and steam in the space.

4. In a hot process water treating apparatus, a treating receptacle having an outlet for treated water and a reaction chamber therein, means for delivering a chemical reagent into said reaction chamber, a plurality of spray nozzles for spraying water to be treated into said reaction chamber, said spray nozzles being arranged at acute angles to the axis of said reaction chamber to direct incoming sprayed water in such manner as to cause rotation of the water in the reaction chamber in substantially horizontal paths, an inlet for steam to said reaction chamber, and a plurality of circumferentially spaced annularly disposed inclined baffles in the path of the residual steam entering the mixing space to direct the entering steam in whirling paths at acute angles to and across the path of the entering water to set up turbulence of the steam and water in the mixing space.

5. In a hot process water treating apparatus, a receptacle, an annular partition within said receptacle forming a reaction chamber and a treated water chamber, an outlet for treated water communicating with said treated water chamber, means opening into the bottom of the reaction chamber and for delivering water from the reaction chamber to the treated water chamber, said reaction chamber having a mixing space therein, means for spraying water through said mixing space, means for spraying treating chemicals through said mixing space, a steam inlet to said mixing space, and a plurality of circumferentially spaced annularly disposed inclined baffles in the path of steam entering the mixing space to direct the incoming steam in rotational paths independently of the path of the sprayed water at acute angles to the directional flow of the incoming water into the mixing space.

6. In a hot process water treating apparatus, a receptacle, an annular partition within said receptacle forming a reaction chamber and a treated water chamber, an outlet for treated water communicating with said treated water chamber, means opening into the bottom of the reaction chamber and for delivering water from the reaction chamber to the treated water chamber, said reaction chamber having a mixing space therein, a plurality of spray nozzles for spraying water to be treated through said mixing space and into said reaction chamber, said spray nozzles being arranged at acute angles to the axis of said reaction chamber to direct the incoming sprayed water in such manner as to cause rotation of the water in the reaction chamber in substantially horizontally rotational paths, an inlet for steam to said reaction chamber, and a plurality of circumferentially spaced annularly disposed inclined baffles in the path of the steam prior to its contact with the sprayed water entering the mixing space to direct steam entering the mixing space in rotational paths at acute angles to the directional flow of the incoming water into said mixing space.

JOSEPH F. SEBALD.

REFERENCES CITED

The following references are of record in the file of this patent:

UNITED STATES PATENTS

| Number | Name | Date |
| --- | --- | --- |
| 1,668,807 | Hawley | May 8, 1928 |
| 2,047,292 | Rohlin | July 14, 1936 |
| 2,160,832 | Contant | June 6, 1939 |
| 2,204,062 | Applebaum | June 11, 1940 |
| 2,210,151 | Rohlin | Aug. 6, 1940 |
| 2,241,873 | Yoder | May 13, 1941 |
| 2,379,753 | Sebald | July 3, 1945 |